(12) United States Patent
Chen et al.

(10) Patent No.: US 9,123,159 B2
(45) Date of Patent: Sep. 1, 2015

(54) INTERACTIVE GEO-POSITIONING OF IMAGERY

(75) Inventors: Billy Chen, Bellevue, WA (US); Eyal Ofek, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1616 days.

(21) Appl. No.: 11/947,958

(22) Filed: Nov. 30, 2007

(65) Prior Publication Data

US 2009/0141966 A1 Jun. 4, 2009

(51) Int. Cl.
*G06T 17/05* (2011.01)
*G06T 7/00* (2006.01)
*G06F 3/0484* (2013.01)
*H04N 19/587* (2014.01)
(Continued)

(52) U.S. Cl.
CPC .............. *G06T 17/05* (2013.01); *G06T 7/0024* (2013.01); *G06T 7/0028* (2013.01); *G06T 19/006* (2013.01); *H04N 5/23232* (2013.01); *H04N 5/23293* (2013.01); *H04N 5/265* (2013.01); *G06F 2203/04804* (2013.01); *G06T 2200/24* (2013.01); *G06T 2207/10016* (2013.01); *G06T 2207/20092* (2013.01); *H04N 19/587* (2014.11)

(58) Field of Classification Search
USPC ......... 345/418–419, 581–582, 606–607, 619, 345/629; 715/764, 856; 382/100, 128–132, 382/153–154, 276, 284–285; 707/912–915, 707/918–919
See application file for complete search history.

(56) References Cited

U.S. PATENT DOCUMENTS 5,982,378 A * 11/1999 Kato .............................. 345/582
5,990,901 A * 11/1999 Lawton et al. ................. 345/581
(Continued)

FOREIGN PATENT DOCUMENTS

GB WO9960525 A1 11/1999
IL WO2007027847 A2 3/2007

OTHER PUBLICATIONS

Christian Frueh, Russell Sammon, Avideh Zakhor, "Automated Texture Mapping of 3D City Models With Oblique Aerial Imagery," 3D Data Processing Visualization and Transmission, International Symposium on, pp. 396-403, Second International Symposium on 3D Data Processing, Visualization and Transmission (3DPVT'04), 2004.*

(Continued)

*Primary Examiner* — Kim Vu
*Assistant Examiner* — Nathan Bloom
(74) *Attorney, Agent, or Firm* — Steven Spellman; Jim Ross; Micky Minhas

(57) ABSTRACT

An interactive user-friendly incremental calibration technique that provides immediate feedback to the user when aligning a point on a 3D model to a point on a 2D image. A can drag-and-drop points on a 3D model to points on a 2D image. As the user drags the correspondences, the application updates current estimates of where the camera would need to be to match the correspondences. The 2D and 3D images can be overlayed on each other and are sufficiently transparent for visual alignment. The user can fade between the 2D/3D views providing immediate feedback as to the improvements in alignment. The user can begin with a rough estimate of camera orientation and then progress to more granular parameters such as estimates for focal length, etc., to arrive at the desired alignment. While one parameter is adjustable, other parameters are fixed allowing for user adjustment of one parameter at a time.

15 Claims, 12 Drawing Sheets

(51) Int. Cl.
*H04N 5/232* (2006.01)
*G06T 19/00* (2011.01)
*H04N 5/265* (2006.01)

(56) References Cited

U.S. PATENT DOCUMENTS

| | | | | |
|---|---|---|---|---|
| 6,118,427 | A * | 9/2000 | Buxton et al. | 345/629 |
| 6,266,453 | B1 * | 7/2001 | Hibbard et al. | 382/294 |
| 6,437,823 | B1 | 8/2002 | Zhang | |
| 7,038,712 | B1 | 5/2006 | Livingston et al. | |
| 7,193,633 | B1 | 3/2007 | Reinhardt et al. | |
| 7,991,283 | B2 | 8/2011 | Chen et al. | |
| 8,379,030 | B1 * | 2/2013 | Hahn | 345/474 |
| 2003/0218607 | A1 * | 11/2003 | Baumberg | 345/419 |
| 2004/0104935 | A1 * | 6/2004 | Williamson et al. | 345/757 |
| 2005/0015005 | A1 * | 1/2005 | Kockro | 600/427 |
| 2005/0140670 | A1 | 6/2005 | Wu et al. | |
| 2005/0261849 | A1 | 11/2005 | Kochi et al. | |
| 2006/0232583 | A1 | 10/2006 | Petrov et al. | |
| 2007/0021668 | A1 * | 1/2007 | Boese et al. | 600/424 |
| 2007/0025605 | A1 * | 2/2007 | Bohm et al. | 382/128 |
| 2007/0076977 | A1 | 4/2007 | Chen et al. | |
| 2007/0109295 | A1 | 5/2007 | Matsumura et al. | |
| 2007/0237420 | A1 * | 10/2007 | Steedly et al. | 382/284 |
| 2007/0287902 | A1 * | 12/2007 | Fuimaono et al. | 600/410 |
| 2008/0024484 | A1 * | 1/2008 | Naimark | 345/419 |
| 2008/0033240 | A1 * | 2/2008 | Hoffman et al. | 600/109 |
| 2008/0143709 | A1 * | 6/2008 | Fassero et al. | 345/419 |
| 2008/0291217 | A1 * | 11/2008 | Vincent et al. | 345/629 |
| 2009/0245691 | A1 * | 10/2009 | Naimark et al. | 382/285 |
| 2010/0286995 | A1 * | 11/2010 | Pekar et al. | 705/2 |

OTHER PUBLICATIONS

Snavely, Noah, Steven M. Seitz, and Richard Szeliski. "Photo tourism: exploring photo collections in 3D." ACM Transactions on Graphics (TOG). vol. 25. No. 3. ACM, 2006.*

Sourimant, Gaël, Luce Morin, and Kadi Bouatouch. "Gps, gis and video fusion for urban modeling." CGI, May (2007).*

Stalling, Detlev, Malte Westerhoff, and Hans-Christian Hege. "Amira: A highly interactive system for visual data analysis." The visualization handbook 38 (2005): 749-67.*

Wu, Jun, et al. "Geo-registration and mosaic of UAV video for quick-response to forest fire disaster." International Symposium on Multispectral Image Processing and Pattern Recognition. International Society for Optics and Photonics, Nov. 15, 2007.*

Zhang, "A Flexible New Technique for Camera Calibration", Dec. 2, 1998, Microsoft Research, pp. 22.

Hartley, "Self-Calibration from Multiple Views with a Rotating Camera", Proceedings of the third European conference on Computer vision (vol. 1), 1994, Springer-Verlag New York, Inc, pp. 8.

Weng et al., "Camera Calibration with Distortion Models and Accuracy Evaluation", vol. 14, No. 10, 1992, IEEE Transaction on Pattern Analysis and Machine Intelligence, pp. 965-980.

"Canoma", retrieved at <<http://www.canoma.com/>>, pp. 6.

Debevec et al., "Modeling and Rendering Architecture from Photographs: A hybrid geometry-and image-based-approach", SIGGRAPH, 1996, pp. 1-10.

"Sketchup", 2007, Google, pp. 1.

"GeoTango", 2005, GeoTango International Corp., pp. 1.

"Realviz", retrieved at <<http:www.realviz.com/>>, pp. 1.

Szeliski, "Stereo Algorithms and Representations for image-Based Rendering", 1999, Proc. British Machine Vision Conference, pp. 314-328.

"Photosynth", 2006, Microsoft Corporation, pp. 1.

"REALVIZ MatchMover Pro", 2007, REALVIZ S.A., p. 1.

Debevec, "Modeling and Rendering Architecture from Photographs", 1996, pp. 154.

* cited by examiner

INTERACTIVE GEO-POSITIONING OF IMAGERY

BACKGROUND

Camera calibration is a large research area in computer vision. A calibrated image is important in many scientific disciplines such as photogrammetry, vision, robotics, and consumer applications. In photogrammetry, a calibrated image enables the measurement of radiance at a particular point. This is used for modeling appearance and geometry, for example. In vision, calibrated images enable 3D reconstruction and texturing; in robotics, calibration is used for robot localization and object avoidance. For consumer applications, calibrated images are useful for geo-spatially organizing captured photos and for providing spatial context.

Calibrating (also referred to as geo-positioning) an image involves computing the parameters of a pinhole camera model that best describe how the image, from a still or video camera, was imaged from the 3D world. In other words, the pinhole camera model describes how a 3D point in the world projects to a 2D pixel in the image. The pinhole camera model represents most imaging devices. The basic pinhole camera model has two parts: intrinsic parameters (intrinsics) and extrinsic parameters (extrinsics). The intrinsics are the focal length, principal point, and pixel skew. These parameters describe properties internal to the camera. The extrinsics are 3D position and orientation. These six parameters describe how the camera is posed in the world. Calibrating an image is equivalent to finding the intrinsics and extrinsics of the associated pinhole camera model.

In practice, calibrating an image (e.g., computing the intrinsic and extrinsic effects) is a tedious process. In most common approaches, the user needs to supply a set of 3D-to-2D correspondences of points and or lines so that the system can estimate the parameters that best fit these measurements. Usually, for uncalibrated cameras (e.g., cameras of unknown intrinsic parameters), there is a need for more than six point correspondences, and in general, a larger set is supplied to minimized the error. For video cameras, more correspondences are needed to find the changing position of the camera over time. Typically, for video cameras, the pinhole camera model has fixed intrinsics and time-varying extrinsics (e.g. pose and orientation that change over time).

Conventional approaches introduce problems related to the user having to enter a large number of correspondences, the system solving for camera parameters and then accessing the result of the calibration. Moreover, there is no direct feedback, thus, the process requires experience in choosing the right set of points that is well spread over the image and requires experience to identify bad matches. Additionally, the user has a limited number of correspondences: one, two, or three, for example. It is desired that for every input of the user, the best position possible can be obtained, even if provided partial information. Still further, the above process needs a set of points of known 3D positions, sometimes referred to as "ground control points". Collecting such accurate ground control points is not an easy task for the layperson.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed interactive calibration technique is a user-friendly application that provides immediate feedback to the user when aligning a point on a 3D model to a point on a 2D image, starting from the first input from the user. For example, the user can select a point on a 3D building, drag the 3D point to a 2D point on a photograph, and then drop the point as a corresponding point. As the user drags the correspondences, the application updates current estimates of where the camera would need to be to match the correspondences.

The 2D and 3D images are overlayed on each other and are sufficiently transparent for visual alignment. The user can switch (e.g., fade in, fade out) the 2D image to the foreground while viewing the 3D model in the background, and vice versa, providing immediate feedback to the user as to the improvements in aligning the two items. Thus, the application affords a user-friendly dynamic incremental alignment technique.

One incremental technique includes starting with a rough estimate of camera orientation, for example, and then progressing to more granular estimates of focal length, etc., to arrive at the desired alignment. In other words, while one parameter is adjustable, other parameters are fixed allowing for user adjustment of one parameter at a time. The number of camera parameters that can be employed is extensible, and the order in which the user chooses to make the correspondences can be configurable. The user can then stop at any point in the process based on the desired alignment. As the user becomes more skilled at the technique, the process can take fewer steps to achieve the desired effect.

To the accomplishment of the foregoing and related ends, certain illustrative aspects are described herein in connection with the following description and the annexed drawings. These aspects are indicative, however, of but a few of the various ways in which the principles disclosed herein can be employed and is intended to include all such aspects and equivalents. Other advantages and novel features will become apparent from the following detailed description when considered in conjunction with the drawings.

DETAILED DESCRIPTION

Figure 1:
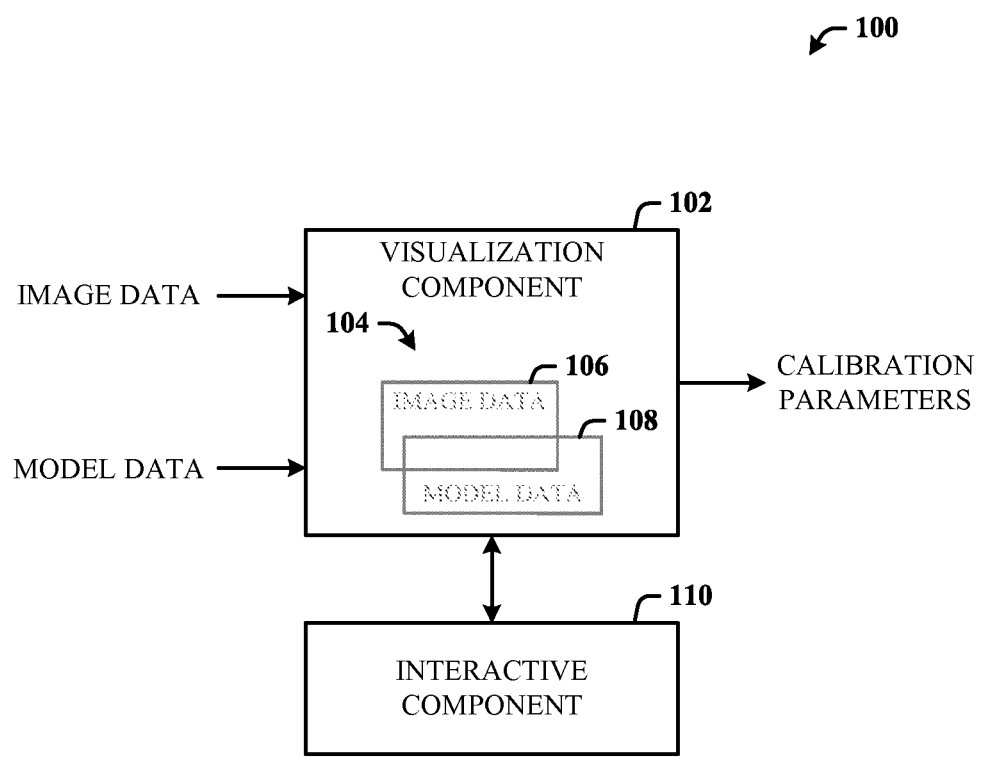
FIG. 1 illustrates a computer-implemented calibration system.

The disclosed architecture is an interactive calibration technique for cameras. In one aspect thereof, the technique focuses on a problem of finding camera calibration, given known geometry, which is not addressed in conventional technologies. The calibration technique is facilitated using an interactive image geo-positioning application for the interactive matching between 3D models and an image, where the output is the global parameters of an image. The disclosed technique begins with minimal number of user inputs. The initial positioning involves no match points at all, but is based on the latitude/longitude and an estimated orientation. The user then enters a match-by-match and the system generates better and better models of the camera.

The user can end the process, before entering five points, for example, using the estimate of the full camera parameters. Additionally, the disclosed technique employs the matching of image primitives rather than wire frames. The user matches between two images: one match for the original image and the other match is for synthesized image of the scene based on a 3D model and existing geo-positioned images that are used to texture the model. The match points can relate to the geometry (such as the corners of a wire box) or to texture features.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof.

FIG. 1 illustrates a computer-implemented calibration system 100. The system 100 includes a visualization component 102 for presenting a semi-transparent overlay 104 of image data 106 with model data 108 in a single view for an image registration process. The system 100 can also include an interactive component 110 for directly manipulating model points of the model data 106 to corresponding image points on the image data 108 during a registration process. The image data 106 and model data 108 can be presented as semi-transparent layers via which the user can directly manipulate the model points using a drag-and-drop operation of points on the model data 108 to points on the image data 106.

The interactive component 110 facilitates incremental registration based on point-by-point selection of the model points and registration on a point-by-point basis until the desired overall registration is obtained. The incremental registration process applies registration using previous model point registration results for fitting the model data to the image data. In other words, a 2-point registration process uses two points for registration, the previous single-point registration results and a new model point. The new 2-point registration process begins relative to the registration results of the single-point registration.

An intuitive and straightforward 2D interaction is provided without the need for 3D understanding. Immediate feedback is provided during the entire drag-and-drop operation. The user can choose points based on the appeared mis-registration between the image and the model data (or hypothesized position). Rather than selecting points for conventional algorithm processing, the user can drag a point in the 3D rendering that is associated with maximum misalignment and view realtime (or dynamic) feedback of the 3D rendering orientation and rotation, for example, when trying to align features of the 3D rendering to the image. Once the user has visually aligned the image data and model data, the output of the system 100 is calibration data or parameters (intrinsics and extrinsics) for the image data. Although shown as an output of the visualization component 102, the calibration parameters can, alternatively, be an output of the interactive component 110.

Figure 2:
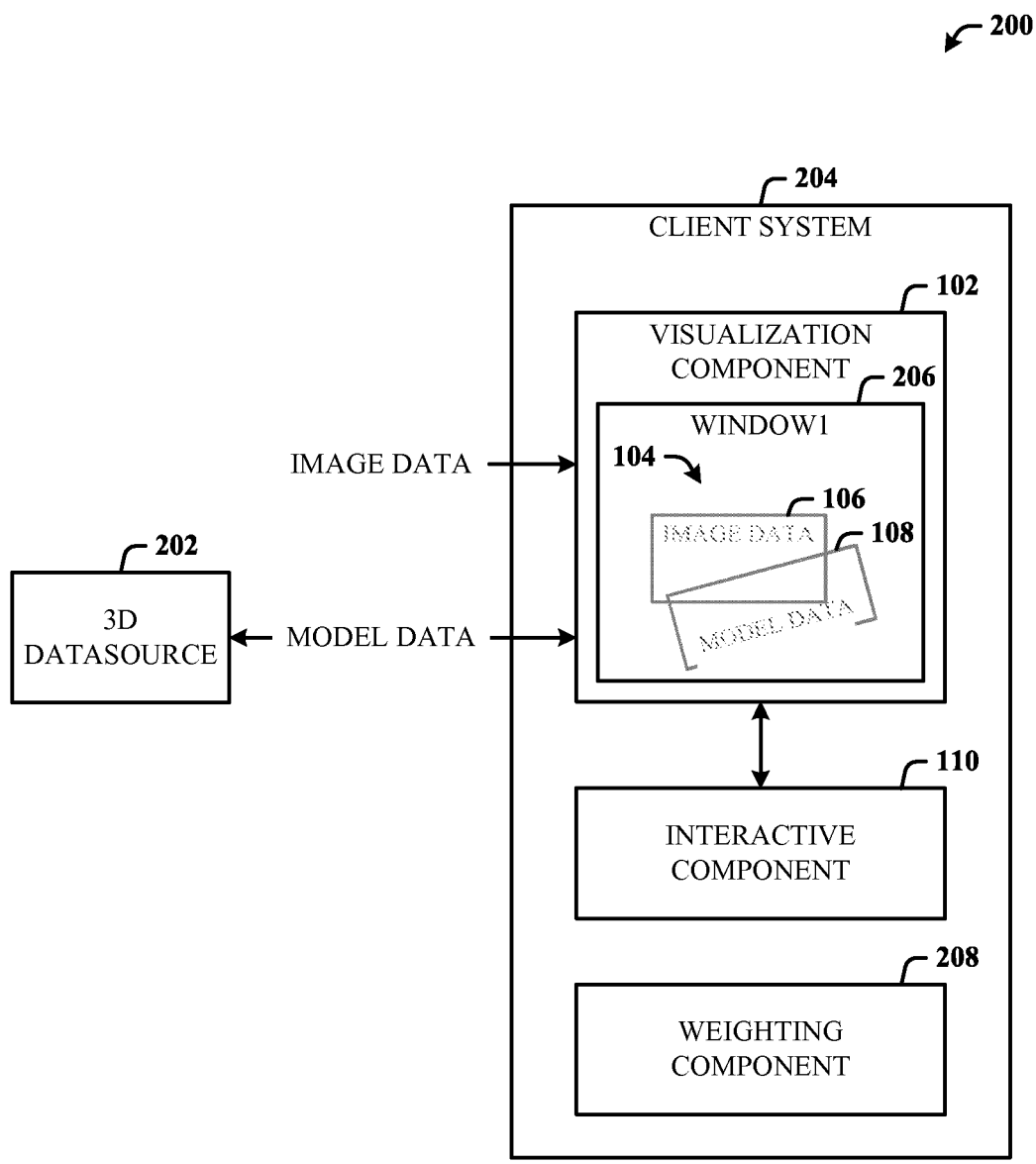
FIG. 2 illustrates a system where the model data can be obtained via a 3D datasource.

FIG. 2 illustrates a system 200 where the model data 108 can be obtained via a 3D datasource 202. The datasource 202 can be an Internet-based website that provides an accessible 3D representation of locations that can be found on a map, orthographic image, or oblique image, for example. The system datasource 202 provides ground control points and lines for features in the model data 108 that the user may want for the calibration process. In another embodiment, the datasource 202 of 3D model data for the earth surface and buildings can be provided on distribution media (e.g., DVD).

In operation, a client system 204 includes the visualization component 102 for presenting the semi-transparent overlay 104 where versions of the image data 106 and the model data 108 are rendered according to dynamically changing transparency settings as the user selects points on and manipulates the model data 108 relative to the image data 106. The overlay 104 is presented in an overlay window 206 as a single view for a user-friendly and intuitive visual image registration process.

The client system 204 can also include the interactive component 110 for manually manipulating model points of the model data 106 to corresponding image points on the image data 108 during the registration process. The corresponding image points can be selected according to scenery in the image data. For example, the model data can include a large building defined by vertical lines and lines of perspective. A point selected for registration can be an apex or corner of the building. Additionally, if the camera is positioned accurately, lines of perspective can be used as a visual means for aligning or registering points in the 3D model with points in the image, thereby improving on the accuracy with which the camera is positioned.

The system 200 also includes a weighting component 208 that allows the user to weight one or more of the constraints (the correspondences or relationships between points or lines in the image and associated points and lines in the 3D world). This indicates to the system 200 that a given correspondence associated with a more heavily weighted constraint is to be satisfied over (or before) a correspondence with a less weighted constraint. In one implementation, this can be represented by placing more pushpins at the same correspondences point.

The visualization component 102 also facilitates the presentation of the system's approximation to user constraints as the user locks-in the correspondences by depicting graphically (or as a tabular list) difference between the system computed approximation alignment and the user-specified alignment.

As previously indicated, the image data 106 and model data 108 can be rendered as semi-transparent layers via which the user can directly manipulate the model points using a drag-and-drop operation by selecting a point of the model data and dragging the point over the image data while visually aligning (or registering) prominent features between the image data 106 and model data 108.

Figure 3:
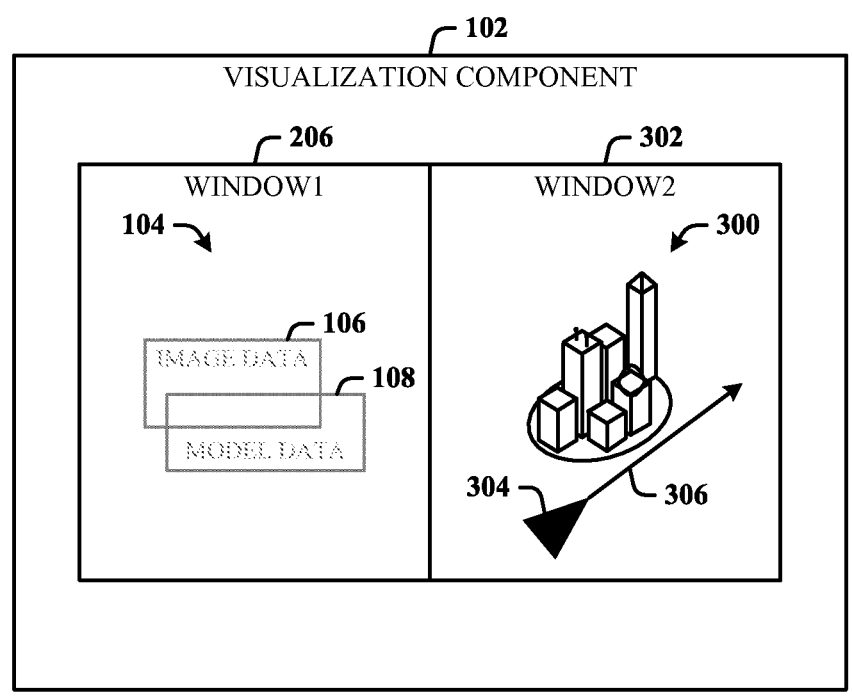
FIG. 3 illustrates a side-by-side visualization technique for user-friendly image registration.

FIG. 3 illustrates a side-by-side visualization technique for user-friendly image registration. The visualization component 102 facilitates the presentation of the overlay 104 in the overlay window 206 as a single view for a user-friendly and intuitive visual image registration process, and the 3D representation 300 of the 3D model data in a 3D window 302, in a side-by-side manner for easy user visualization and interaction. Note that alternatively, the windows (206 and 302) can be presented on separate monitors in a multi-monitor configuration.

To begin the interactive portion of the calibration process, the user inputs a coarse (or approximate) 2D position 304 of the camera using, for example, latitude/longitude on a map or an orthographic image, or an oblique image. The user can also draw a view direction 306 (e.g., an arrow) relative to the camera position 304 using a mouse, for example, and/or other input device. In other words, the user can enter this data, is by clicking the mouse on the approximate position, and drag to draw an arrow that displays the approximate view direction. This information can also be entered in a textual format such as "$5^{th}$ Ave, and looked down the $7^{th}$ street". Another option for entering the camera information, for example, is to enter the 2D location based on GPS (global positioning system) data, and the orientation (e.g., direction the camera is facing) may be captured by other directional devices or sensors such as a compass or an orientation sensor.

It is to be appreciated that if the user initially sets the camera position and view direction and is dissatisfied with the results or number of steps taken to approximate the image, and has not achieved the desired registration, the user can reposition the 3D camera position 304 to a new location, redraw the view direction 306 in the 3D window 302, and begin again.

Figure 4:
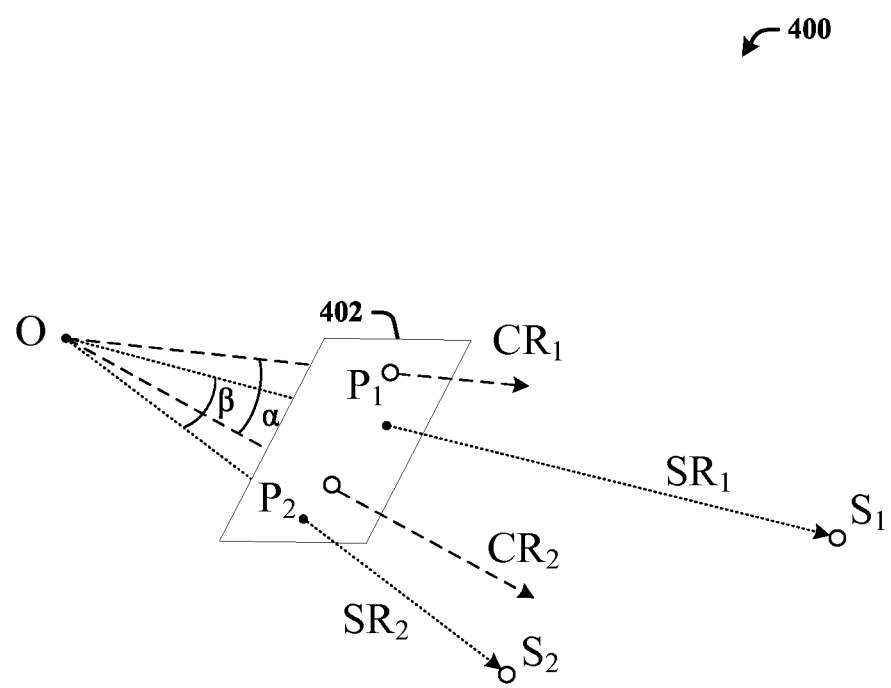
FIG. 4 illustrates a spatial representation of image points and model points for a registration process.

FIG. 4 illustrates a spatial representation 400 of image points and model points for a registration process. An image 402 is presented with two image points $P_1$ and $P_2$, which further define corresponding camera rays $CR_1$ and $CR_2$. An angle $\alpha$ between camera rays $CR_1$ and $CR_2$ is a function of the focal length $f$. Two corresponding scene points $S_1$ and $S_2$ (also referred to as correspondence points or model points) in 3D space, along with the camera position O, define two scene rays $SR_1$ and $SR_2$. An angle between the scene rays is denoted angle $\beta$. Focal length $f$ is chosen such as that angle $\alpha$ is equal to angle $\beta$. The orientation of the camera O is manipulated manually such that camera rays $CR_1$ and $CR_2$ align with corresponding scene rays $SR_1$ and $SR_2$. Once the user is pleased with the results, the second points can be pinned (or locked in) to fix that match between the camera rays and the scene rays.

With respect to weighting, the user can manually assign different weights to the correspondences (or relationships) between the image points and lines and the model points and lines. This is more applicable to instances where the number of points exceeds three. For example, weighting can be applied such that in a 3-point operation the second point is weighted more heavily (than the first point and the third point) to align before the third point or the first point. This also applied to the associated lines.

Figure 5:
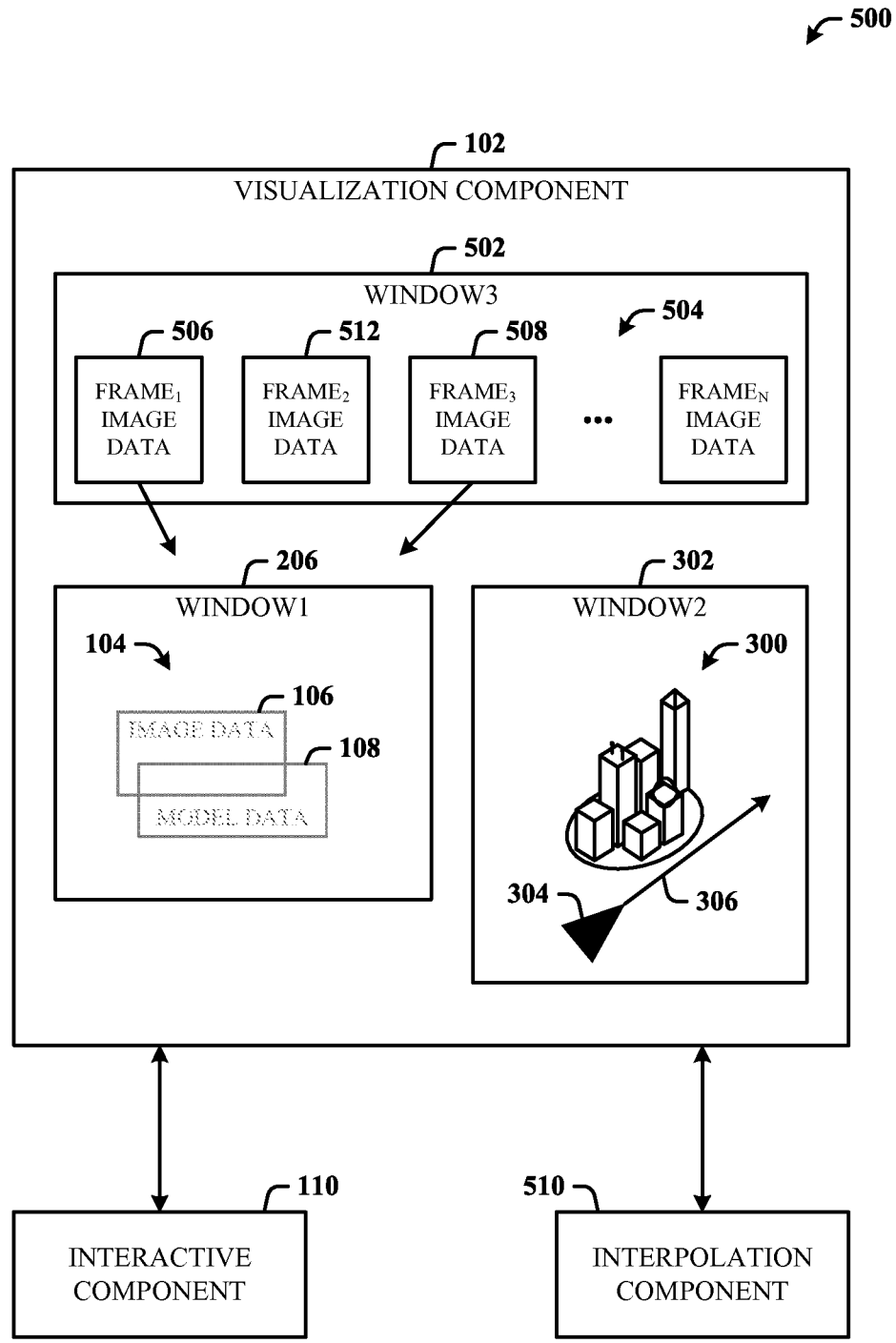
FIG. 5 illustrates a system that employs image calibration for video.

FIG. 5 illustrates a system 500 that employs image calibration for video. Here, the visualization component 102 includes the overlay window 206 as the single view for a user-friendly and intuitive visual image registration process. The visualization component 102 also includes the 3D representation 300 of the 3D model data in the 3D window 302 in a side-by-side manner for easy user visualization and interaction. Additionally, the visualization component 102 can include a video frame window 502 for presenting and interacting with one or more video frames 504 (denoted $FRAME_1$ IMAGE DATA, . . . , $FRAME_N$ IMAGE DATA). For example, the user can select a first frame 506 as the image data 106 in the overlay window 206 against which direct manipulation of the model data 108 occurs for the registration process. Once the user is satisfied with the registration for that first frame 506, the user can then select a third frame 508 for registration processing as the image data 106. The user can adjust only frames that are badly misaligned and not every frame of the video. In this example, a third frame 508 is selected next for registration. Once satisfied with the registration, the system 500 can then employ an interpolation component 510 for interpolating registration information for the skipped frame, a second frame 512.

This interpolation process also can be applied to multiple skipped frames. In other words, the disclosed registration technique can be applied to some frames but not full correspondence. As a global process, the position of the video camera can be approximated as the video camera moves around. The disclosed technique solves for plausible cameras even when the camera is unconstrained, and extrapolates to all frames for video. Thus, the user plays the video and in the background the user views the geometry moving freely according to what the camera motion is expected to be. Whenever the user sees that the camera is moving away from the desired position, the user can stop and reposition that frame. This can minimize how many frames the user will need to register to re-position the video camera. The true position of each frame by itself is the same process.

Thus, the user can string out a large number of frames and then pick certain frames and then interpolate the rest. This applies generally to collections of images. The images can also include images not only from a standard camera but panoramic images as well.

Following is a series of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 6:
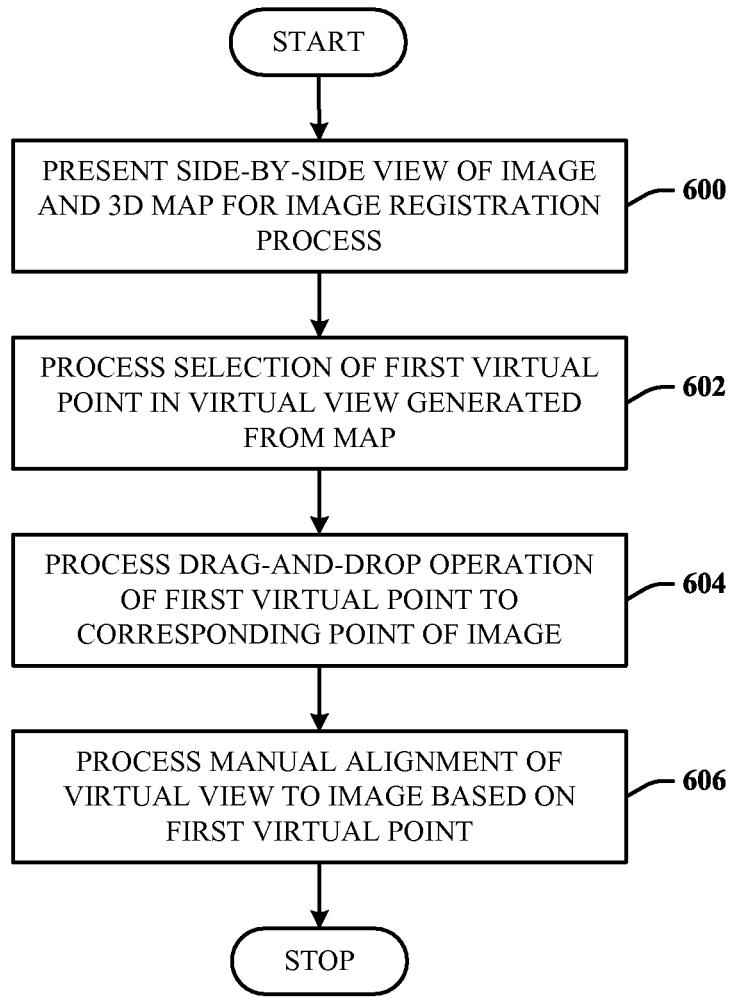
FIG. 6 illustrates a method of calibrating an image in accordance with the subject architecture.

FIG. 6 illustrates a method of calibrating an image in accordance with the subject architecture. At 600, a side-by-side view of an image and 3D map is presented for an image registration process. The side-by-side view facilitates a user-friendly direct manipulation process of points of the virtual view relative to the image. At 602, the system processes selection by the user of a first virtual point in the virtual view. At 604, the selection of the first virtual point is part of a drag-and-drop operation where the first virtual point corresponds to an image point in the image. At 606, the system processes manual alignment by the user of the virtual view to the image based on the first virtual point.

The interaction technique disclosed herein if facilitated by the utilization of a single view to display both image and ground/model data. This allows the user to focus on a single view, and also to access the misalignment between the image and the current estimated calibration of the virtual view. One example of direct manipulation of the calibration process includes the user dragging one or more points of misalignment, and the camera parameters are automatically updated in realtime as a result of the user interaction. The order in which camera parameters are solved for provides an intuitive means of calibration when unconstrained, as can occur in conventional systems. The use of existing 3D models of the earth and other structure (e.g., buildings) as a source for ground control points and lines facilitates the user-friendly experience. Accordingly, a layman user with no experience in 3D navigation and perception can calibrate an image by recovering the position of the camera that took the image and camera parameters such as camera orientation and internal parameters.

The disclosed architecture overcomes conventional registration systems where the user may have a difficult time conceiving the 3D structure of the scene. The user may not be able to understand, for example, that the camera is too high or needs to be rotated. Most users can easily manipulate a matching operation between two 2D images, and perceive one feature looks the same as another feature in another image.

The disclosed architecture is interactive and responsive from the start. Any operation performed by the user, such as picking and dragging is followed by a realtime response. The system automatically processes and provides the 3D data based on the 2D input by the user, given that many users may have a hard time supplying 3D data. Moreover, the system generates the best possible calibration hypothesis based on the user input even when the user supplies only partial input.

Figure 7:
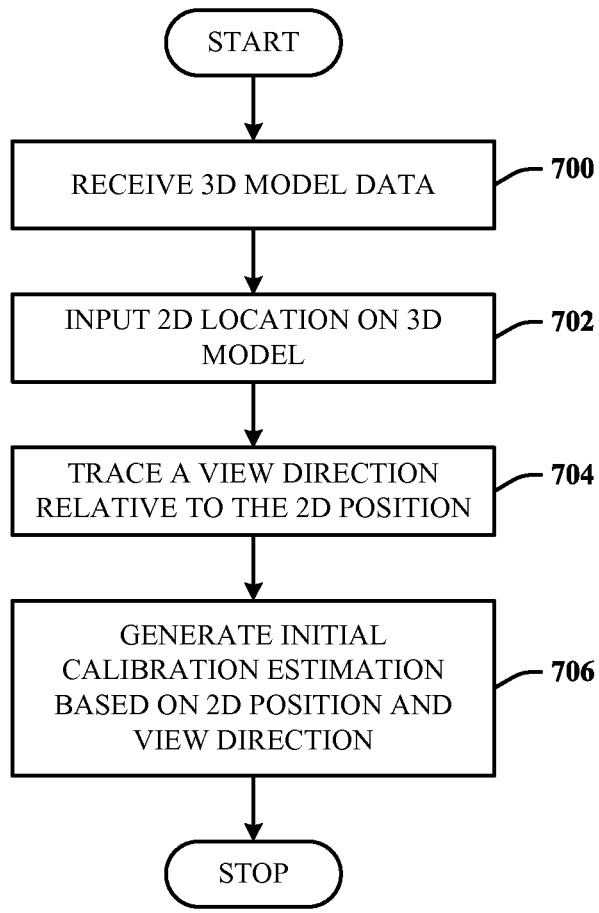
FIG. 7 illustrates a method of setting camera position and view direction.

FIG. 7 illustrates a method of setting camera position and view direction. At 700, 3D model data of a geo-location is obtained. At 702, given an image to be calibrated, the user inputs a rough 2D position of the camera (e.g., latitude/longitude) on the 3d model (e.g., a map or an orthographic image, or an oblique image), such as can be obtained from a network service or distribution media. At 704, the user also traces a rough view direction relative to the camera position. One way that the user can enter this data is by clicking the mouse on the approximate position in the 3D model and dragging to draw an arrow that displays the approximate view direction. Another available option is to enter the 2D location based on GPS, and the orientation can be captured by a compass or an orientation sensor. At 706, the registration process proceeds to generate an initial calibration estimation based on the 2D position and view direction.

Figure 8:
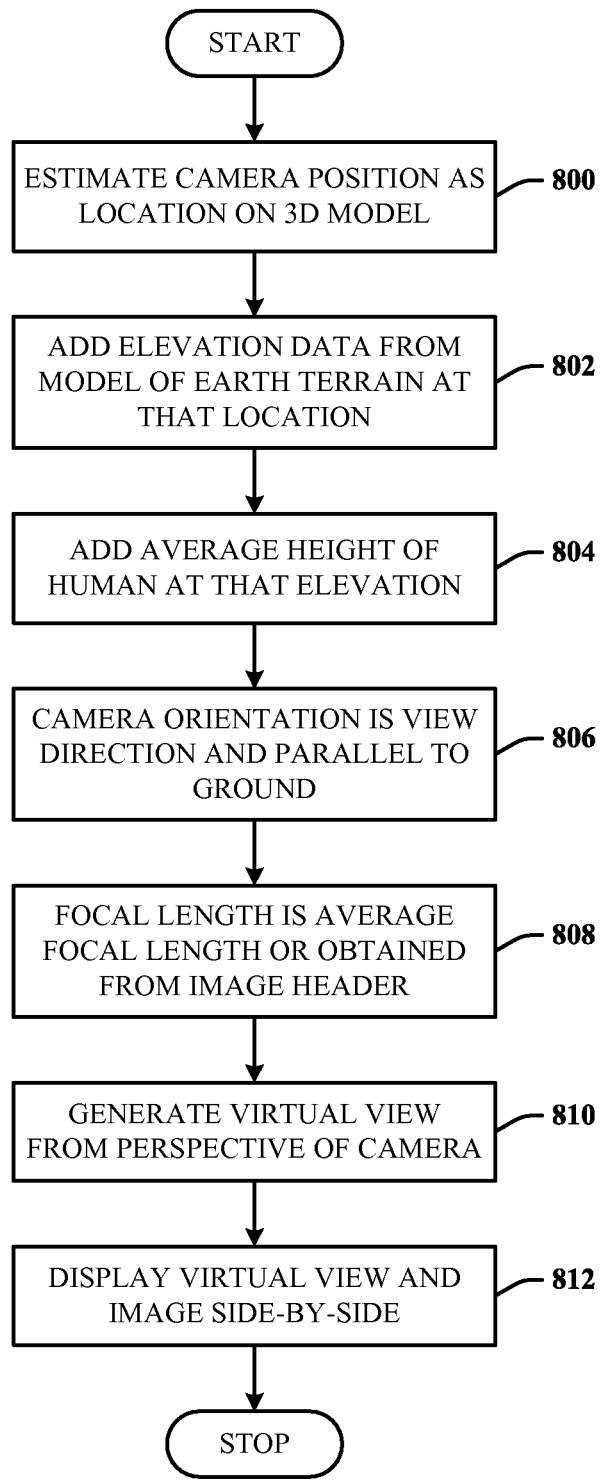
FIG. 8 illustrates a method of generating an initial calibration estimation.

FIG. 8 illustrates a method of generating an initial calibration estimation. At 800, the camera position is estimated at a location on a 3D model. At 802, elevation data is added at that location based on a model of the earth terrain. At 804, the average height of a human is added to the camera position at that location. At 806, the camera orientation is computed to be the view direction and parallel to the ground at that location. Orientation is assumed to be along the 2D view direction previously supplied by the user, and parallel to the ground. Most photographs are shot in the horizontal direction. At 808, the focal length setting for the camera is assumed to be an average focal length (given a view angle of about thirty degrees). Alternatively, the focal length can be obtained header information of the image, if the focal length information is saved in the header by the camera.

Given the initial calibration, a 3D model of the earth and objects on the earth's surface (e.g., houses) at that location are employed to generate a virtual view observed from the perspective of the camera, as indicated at 810. At 812, both the original photographic image and the virtual view are displayed to the user side-by-side on the same window.

Figure 9:
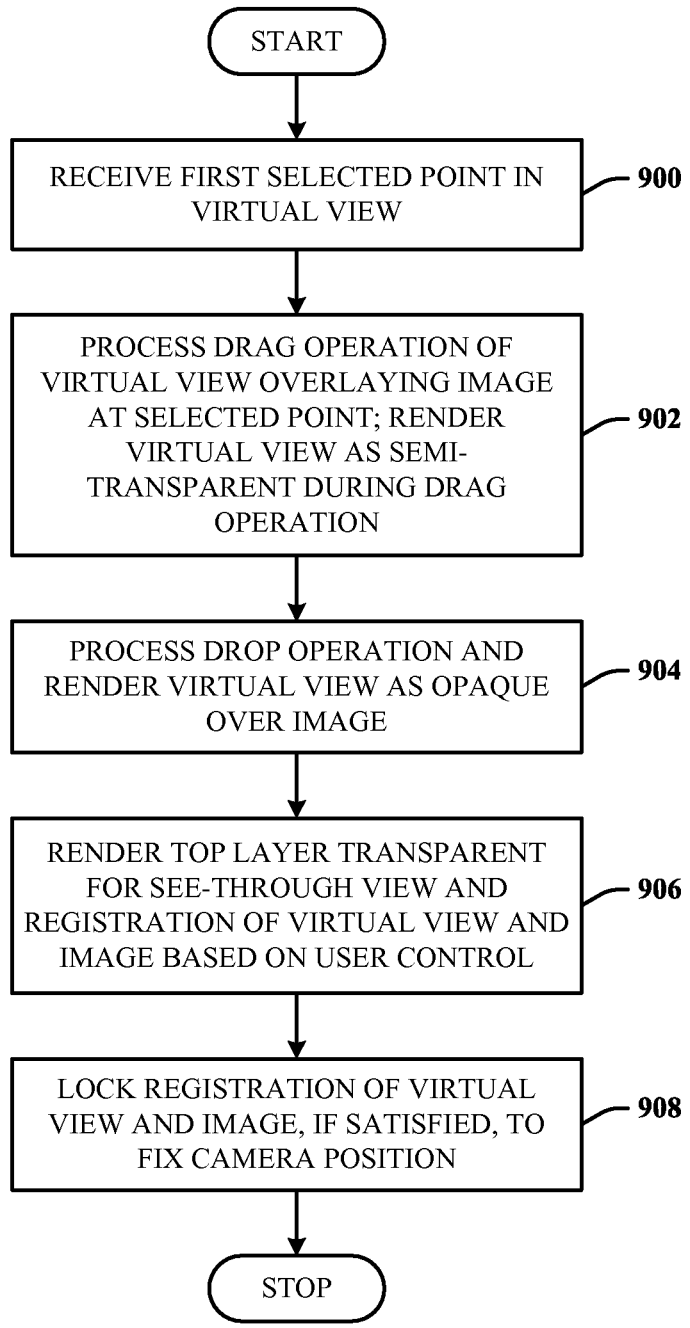
FIG. 9 illustrates a method of incremental registering beginning with a first point.

FIG. 9 illustrates a method of incremental registering beginning with a first point. At 900, the system receives a first selected point in the virtual view from the user. At 902, the system processes a drag operation of a copy of the virtual view by overlaying the virtual view on the image. The virtual view is rendered as a semi-transparent during the drag operation. The user chooses one of many potentially recognizable features in the virtual view and in the image, clicks it on the virtual view, and drag the virtual view until the virtual view aligns substantially or all on the corresponding space in the image. The dragged virtual view is rendered on top of the original image, but displayed as a semi-transparent layer during the drag operation so that the user can better see the underlying image. Another option is to show the virtual image as an edge image where the geometry is hinted by the edges and most of the image is transparent to show the underlying image.

By dragging the selected registration point, the user controls the camera parameters in the back end. In this case, the camera is rotated such that the chosen point in the rendered virtual view appears in the same place that user wishes it to be—where the corresponding feature is located in the underlying image.

Since the virtual view is a 3D model of the world, the 2D selection of a point by the user on the image of the rendered virtual view, can be interpreted as a scene point in the world. The rotation estimated brings that ray, originated from the camera through the pixel of the real image, to fit with a ray that originates from the estimated camera position toward the selected scene point.

Rotation can be described by three angles, such as roll (around the view direction), pitch (from horizontal orientation), and azimuth (from the North) of the camera. Only two values are updated—the azimuth and the pitch. The roll is assumed to be vertical, and such vertical objects in the world are displayed vertically in the image.

At 904, the user performs the drop operation and the system renders the virtual view as opaque. In other words, once the user releases the mouse button, the geometry can be displayed as a totally opaque layer, and the user can see the registration (or fit) between the rendered virtual view and the photograph. At 906, the top layer (or virtual view) is rendered transparent. Thus, the user can toggle between viewing the rendered virtual view layer and the original photograph image as desired, for better visual comparison. At 908, if satisfied with the alignment, the user can lock the alignment, effectively fixing the position of camera. In one implementation, by using a right-click of a mouse, an icon of a push-pin will appear at the location of the feature.

Figure 10:
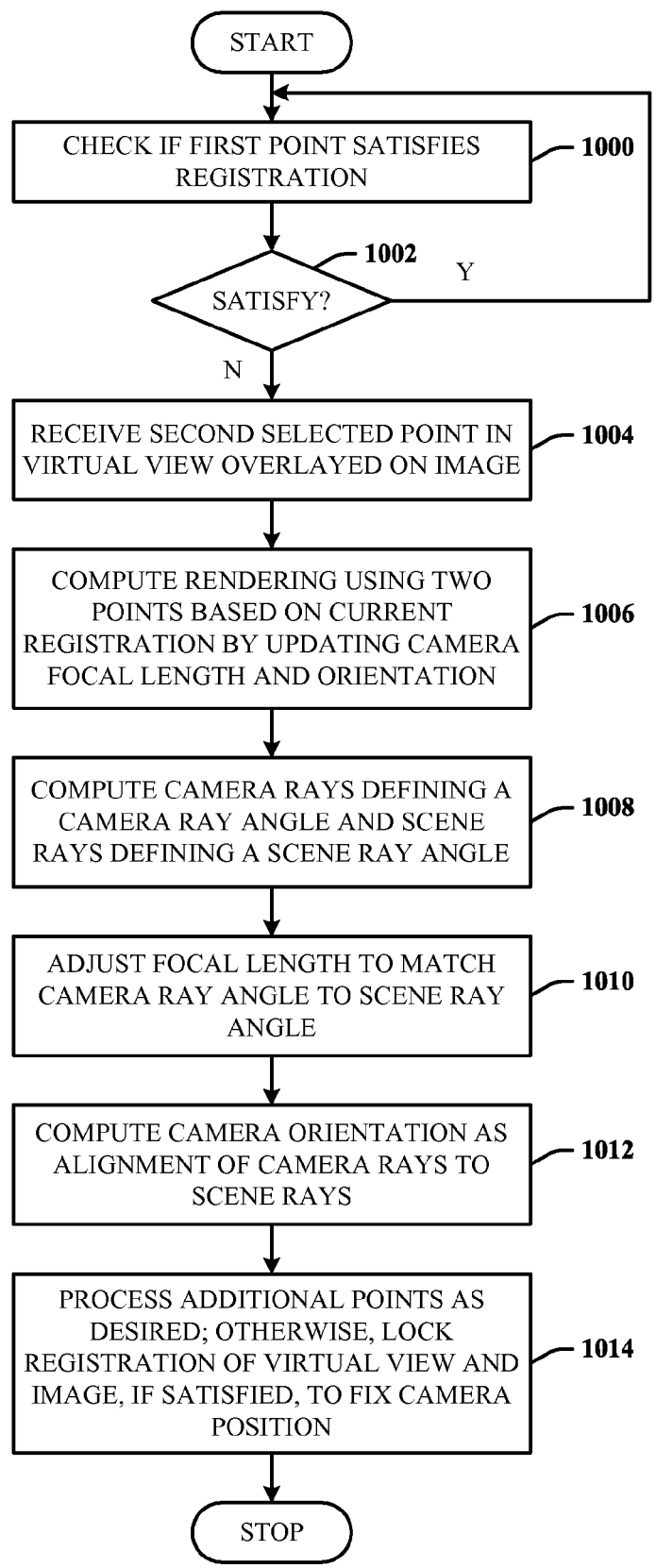
FIG. 10 illustrates a method of incremental registering beginning continuing with a second point.

FIG. 10 illustrates a method of incremental registering beginning continuing with a second point. At 1000, the system checks if the first point satisfies the user as to registration between the virtual view and the underlying image. At 1002, if satisfied, flow loops back to the input of 1000 to keep checking. If there is still a mis-registration between the rendered virtual view and the image, the user can select another point of the rendered virtual view and drag the point to a place that better fits the image, as indicated at 1004. Note that the selection of the second point is made based on the fit of the model up till now.

The user will naturally tend to add a point in an area that has the worst fit in order to correct the calibration. As the user drags the $2^{nd}$ point, the back-end model of the calibration is updated in order to fit now two points between the rendered virtual view and the original image. At 1006, the rendering is computed using the two points based on the current registration by updating the camera focal length and camera orientation. The focal length controls the scale of the image. Another constraint used by the system is that most images do not have a roll component, so the focal length and orientation are adjusted, maintaining the same upward direction in the image.

Since there are now two known points in the virtual view at this time and corresponding points in the image, both can be estimated. At 1008, the two points in the image define two 3D rays that originate from the camera, referred to herein as camera rays. The angle between the camera rays is dependent on the focal length (see FIG. 4). The two virtual view points and the camera estimated position define two additional rays, referred to herein as scene rays. At 1010, the focal length is adjusted to match the camera ray angle to the scene ray angle. At 1012, the camera orientation is rotated (now estimating the full three angles) to align the camera rays to the scene rays. This can complete the registration process for two points, if the user is satisfied with the registration between the virtual view and the image.

At 1014, the user can utilize three or more points as desired. Otherwise, the user can lock in the registration of the virtual view to the image to fix the camera position.

When the user specifies more than a certain number of points (e.g., six), the complexity can increase to a point where the system becomes overconstrained, that is, there are more constraints than the unknowns of the intrinsics and the extrinsics. The disclosed system allows the visualization of the system's approximation to the user constraints. In other words, as the user locks down these correspondences in the image, the system shows the difference in what the system solves for and what the user actually specifies. The realtime interactive functionality of the disclosed architecture provides immediate feedback to the user for visualizing which constraints are more important and which constraints are not being satisfied sufficiently well. Conventional techniques cannot show this due to the lack of realtime feedback, as disclosed herein.

Conventional photogrammetric algorithms for minimal estimations of the camera calibration can be employed for three or more points. As the user adds more points, these conventional algorithms can be invoked and applied for estimating the camera calibration using three or more points. The more points added by the user in the form of selecting a feature in the rendered virtual view image and dragged on top of the corresponding place in the image, the better the calibration.

For video applications, multiple correspondences can be given across frames to encapsulate the motion (e.g., time-varying extrinsics) of the camera. The interaction on a frame image remains the same as above; however the user now has the freedom to play the video back and forth (via the frames). Based on calibration from previous frames, the system predicts the next view of the 3D models and overlays that on top of the video frame. If not the correct registration, the user can again drag points on that frame for more accurate alignment. Unlike the single-image case, the user need not specify all corresponding points in a single frame of video. The user may choose to align only the more drastic differences across multiple frames and the system performs a global alignment across all frames. The motion prediction model can be a conventional model that employs a Kalman filter, for example.

Analysis of the camera motion from the video itself can be used to progress the geo-position of the camera along consecutive video frames. Relative frame positions and 3D structures generated from the video itself using a structure-from-motion technique can also be used to reduce the number of frames along a video that need to be geo-positioned.

Figure 11:
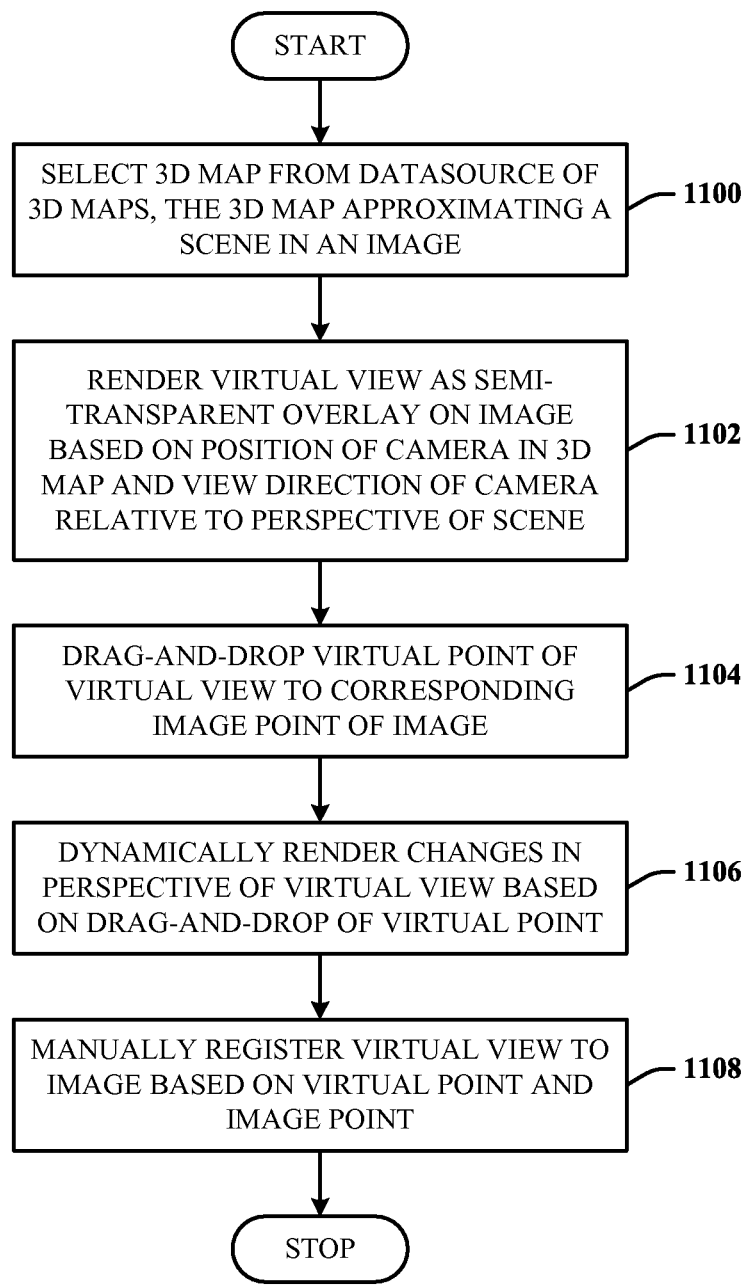
FIG. 11 illustrates an alternative method of geo-positioning an image.

FIG. 11 illustrates a more detailed method of geo-positioning an image. At 1100, a 3D map is selected from a datasource of 3D maps that approximates a scene in an image for calibration. At 1102, a virtual view is rendered as a semi-transparent overlay on the image based on positioning of a camera in the 3D map and defining a view direction of the camera in the 3D map relative to a perspective of a scene in the image. At 1104, a virtual point in the virtual view is dragged-and-dropped to a corresponding image point in the image. At 1106, in perspective of the virtual view based on drag-and-drop of the virtual point are rendered dynamically. At 1108, the virtual view is manually registered to the image based on the virtual point. Additionally, a second point in the virtual view can be selected and the virtual view registered to the image based on the virtual point and the second virtual point. The camera parameters can be automatically updated related to focal length and camera orientation based on direct manipulation of the virtual point. When the desired registration is obtained, the camera parameters can be locked based on final registration of the virtual view to the image.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Figure 12:
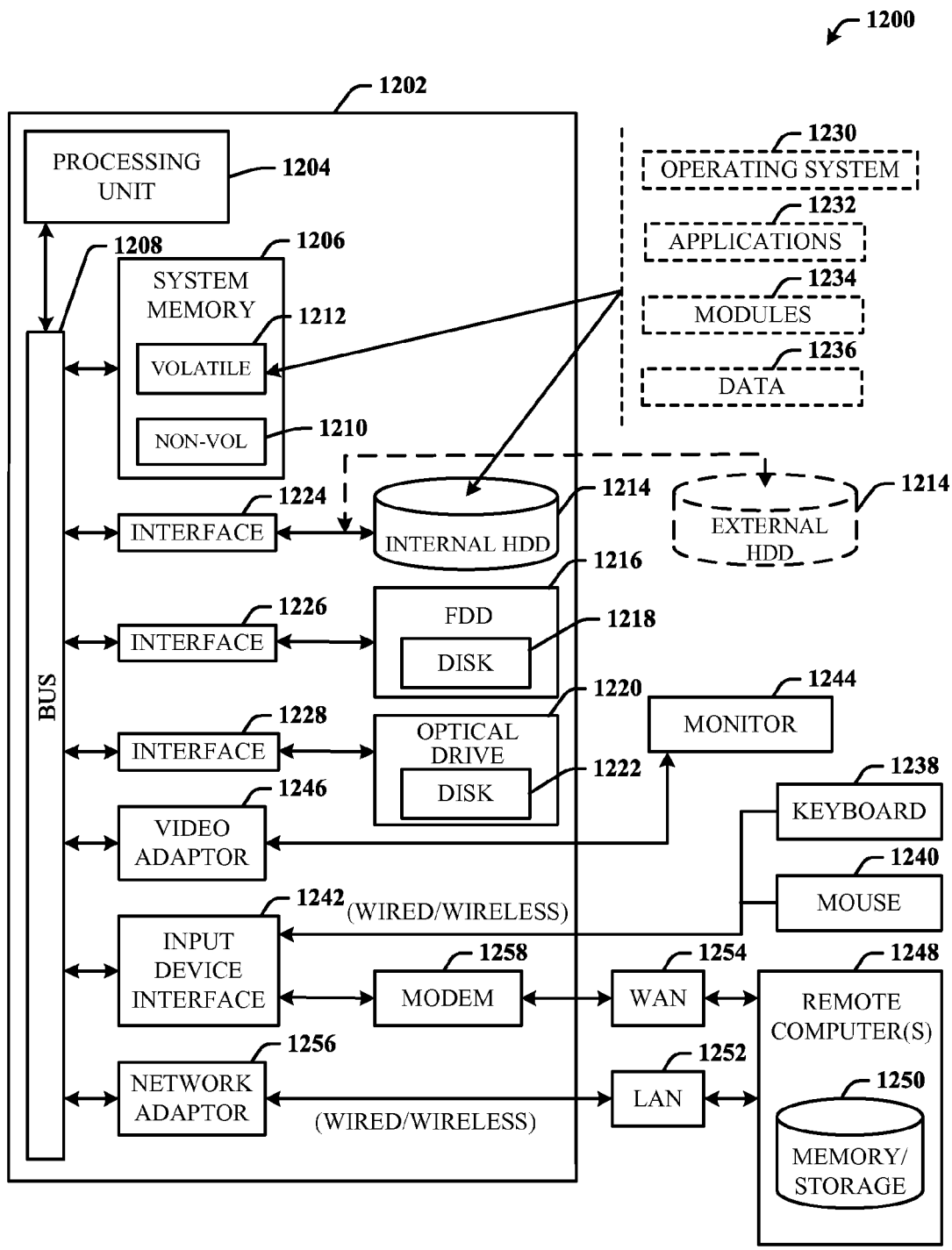
FIG. 12 illustrates a block diagram of a computing system operable to execute interactive geo-positioning in accordance with the disclosed architecture.

Referring now to FIG. 12, there is illustrated a block diagram of a computing system 1200 operable to execute interactive geo-positioning in accordance with the disclosed architecture. In order to provide additional context for various aspects thereof, FIG. 12 and the following discussion are intended to provide a brief, general description of a suitable computing system 1200 in which the various aspects can be implemented. While the description above is in the general context of computer-executable instructions that may run on one or more computers, those skilled in the art will recognize that a novel embodiment also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes volatile and non-volatile media, removable and non-removable media. By way of example, and not limitation, computer-readable media can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 12, the exemplary computing system 1200 for implementing various aspects includes a computer 1202 having a processing unit 1204, a system memory 1206 and a system bus 1208. The system bus 1208 provides an interface for system components including, but not limited to, the system memory 1206 to the processing unit 1204. The processing unit 1204 can be any of various commercially available processors. Dual microprocessors and other multi-processor architectures may also be employed as the processing unit 1204.

The system bus 1208 can be any of several types of bus structure that may further interconnect to a memory bus (with or without a memory controller), a peripheral bus, and a local bus using any of a variety of commercially available bus architectures. The system memory 1206 can include non-volatile memory (NON-VOL) 1210 and/or volatile memory 1212 (e.g., random access memory (RAM)). A basic input/output system (BIOS) can be stored in the non-volatile memory 1210 (e.g., ROM, EPROM, EEPROM, etc.), which BIOS stores the basic routines that help to transfer information between elements within the computer 1202, such as during start-up. The volatile memory 1212 can also include a high-speed RAM such as static RAM for caching data.

The computer 1202 further includes an internal hard disk drive (HDD) 1214 (e.g., EIDE, SATA), which internal HDD 1214 may also be configured for external use in a suitable chassis, a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as a DVD). The HDD 1214, FDD 1216 and optical disk drive 1220 can be connected to the system bus 1208 by a HDD interface 1224, an FDD interface 1226 and an optical drive interface 1228, respectively. The HDD interface 1224 for external drive implementations can include at least one or both of Universal Serial Bus (USB) and IEEE 1394 interface technologies.

The drives and associated computer-readable media provide nonvolatile storage of data, data structures, computer-executable instructions, and so forth. For the computer 1202, the drives and media accommodate the storage of any data in a suitable digital format. Although the description of computer-readable media above refers to a HDD, a removable magnetic diskette (e.g., FDD), and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing novel methods of the disclosed architecture.

A number of program modules can be stored in the drives and volatile memory 1212, including an operating system 1230, one or more application programs 1232, other program modules 1234, and program data 1236. The one or more application programs 1232, other program modules 1234, and program data 1236 can include the visualization component 102, the interactive component 110, the image data 106, the model data 108, the client system 204, the 3D datasource 202, the software-generated windows 206 and 302, the camera 304 and view direction 306, the image 402, software-generated window 502, the frames 504, and the interpolation component 510, for example.

All or portions of the operating system, applications, modules, and/or data can also be cached in the volatile memory 1212. It is to be appreciated that the disclosed architecture can be implemented with various commercially available operating systems or combinations of operating systems.

A user can enter commands and information into the computer 1202 through one or more wire/wireless input devices, for example, a keyboard 1238 and a pointing device, such as a mouse 1240. Other input devices (not shown) may include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces such as a parallel port, IEEE 1394 serial port, a game port, a USB port, an IR interface, etc.

A monitor 1244 or other type of display device is also connected to the system bus 1208 via an interface, such as a video adaptor 1246. In addition to the monitor 1244, a computer typically includes other peripheral output devices (not shown), such as speakers, printers, etc.

The computer 1202 may operate in a networked environment using logical connections via wire and/or wireless communications to one or more remote computers, such as a remote computer(s) 1248. The remote computer(s) 1248 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1250 is illustrated. The logical connections depicted include wire/wireless connectivity to a local area network (LAN) 1252 and/or larger networks, for example, a wide area network (WAN) 1254. Such LAN and WAN networking environments are commonplace in offices and companies, and facilitate enterprise-wide computer networks, such as intranets, all of which may connect to a global communications network, for example, the Internet.

When used in a LAN networking environment, the computer 1202 is connected to the LAN 1252 through a wire and/or wireless communication network interface or adaptor 1256. The adaptor 1256 can facilitate wire and/or wireless communications to the LAN 1252, which may also include a wireless access point disposed thereon for communicating with the wireless functionality of the adaptor 1256.

When used in a WAN networking environment, the computer 1202 can include a modem 1258, or is connected to a communications server on the WAN 1254, or has other means for establishing communications over the WAN 1254, such as by way of the Internet. The modem 1258, which can be internal or external and a wire and/or wireless device, is connected to the system bus 1208 via the input device interface 1242. In a networked environment, program modules depicted relative to the computer 1202, or portions thereof, can be stored in the remote memory/storage device 1250. It will be appreciated that the network connections shown are exemplary and other means of establishing a communications link between the computers can be used.

The computer 1202 is operable to communicate with any wireless devices or entities operatively disposed in wireless communication, for example, a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi (or Wireless Fidelity) and Bluetooth™ wireless technologies. Thus, the communication can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3 or Ethernet).

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented calibration system, comprising:
    a visualization component for presenting an overlay of image data and model data in a single view for an image registration process, the image data and model data being presented as semi-transparent layers, the image data being a selected one of frames of video data presented in a frame format;
    an interactive component for directly manipulating model points of the model data to corresponding image points on the image data during the image registration process, the interactive component allowing manipulation of the model data so that the model data overlies the image data or manipulation of the image data such that the image data overlies the model data; and
    an interpolation component that applies an interpolation process to multiple skipped frames between selected ones of the frames, when the system is used for more than one image registration process and non-adjacent ones of the frames are selected as respective image data for the image registration processes, the interpolation process being based on registration results of the selected frames.

2. The system of claim 1, further comprising a 3D datasource from which the model data is retrieved and, ground control points and lines are defined, based on the image data.

3. The system of claim 1, wherein the interactive component receives a starting point of the registration process as a location of a camera and a view direction relative to the camera.

4. The system of claim 3, wherein the starting point further considers elevation of the camera, average height of a user at the camera location, focal length of the camera.

5. The system of claim 1, wherein the visualization component presents the image data and the model data side-by-side for a drag-and-drop operation.

6. The system of claim 1, wherein the interactive component facilitates incremental registration based on point-by-point selection of the model points and registration on a point-by-point basis until overall registration is obtained.

7. The system of claim 6, wherein the incremental registration applies registration using previous model point registration results for fitting the model data to the image data.

8. The system of claim 1, wherein a transparency of the semi-transparent layers changes as the model points of the model data to corresponding image points on the image data are directly manipulated.

9. A computer-implemented image calibration method, comprising:
    presenting an overlay of image data and model data in a single view for an image registration process, the image data and model data being presented as semi-transparent layers, the image data being a selected one of frames of video data presented in a frame format;
    manipulating model points of the model data to corresponding image points on the image data during the image registration process, the interactive component allowing manipulation of the model data so that the model data overlies the image data or manipulation of the image data such that the image data overlies the model data; and
    applying an interpolation process to multiple skipped frames between selected ones of the frames, when the system is used for more than one image registration process and non-adjacent ones of the frames are selected as respective image data for the image registration processes, the interpolation process being based on registration results of the selected frames.

10. The method of claim 9, wherein, in the manipulating, a starting point of the registration process is received as a location of a camera and a view direction relative to the camera.

11. The method of claim 10, wherein the starting point further considers elevation of the camera, average height of a user at the camera location, and focal length of the camera.

12. The method of claim 9, wherein the presenting includes presenting the image data and the model data side-by-side for a drag-and-drop operation.

13. The method of claim 9, wherein the manipulating facilitates incremental registration based on point-by-point selection of the model points and registration on a point-by-point basis until overall registration is obtained.

14. The method of claim 13, wherein the incremental registration applies registration using previous model point registration results for fitting the model data to the image data.

15. A system for calibrating an image, the system comprising:
    at least one processor; and
    a memory storing instructions that, when executed by the at least one processor, causes the at least one processor to perform a method including:
        presenting an overlay of image data and model data in a single view for an image registration process, the image data and model data being presented as semi-transparent layers, the image data being a selected one of frames of video data presented in a frame format;
        manipulating model points of the model data to corresponding image points on the image data during the image registration process, the interactive component allowing manipulation of the model data so that the model data overlies the image data or manipulation of the image data such that the image data overlies the model data; and applying an interpolation process to multiple skipped frames between selected ones of the frames, when the system is used for more than one image registration process and non-adjacent ones of the frames are selected as respective image data for the image registration processes, the interpolation process being based on registration results of the selected frames.

* * * * *